US008796162B2

(12) United States Patent
Monfalcone, III et al.

(10) Patent No.: US 8,796,162 B2
(45) **Date of Patent: *Aug. 5, 2014**

(54) THERMALLY PROTECTIVE FLAME RETARDANT FABRIC

(75) Inventors: Vincent Andrews Monfalcone, III, Greensboro, NC (US); Charles Detwiler Roberson, Greensboro, NC (US); Ladson L. Fraser, Jr., High Point, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/172,681

(22) Filed: Jul. 14, 2008

(65) Prior Publication Data

US 2009/0061131 A1 Mar. 5, 2009

Related U.S. Application Data

(63) Continuation of application No. 10/143,833, filed on May 14, 2002, now abandoned.

(60) Provisional application No. 60/290,352, filed on May 14, 2001.

(51) Int. Cl.

| | |
|---|---|
| ***B32B 5/02*** | (2006.01) |
| ***D06M 11/71*** | (2006.01) |
| ***D06M 11/36*** | (2006.01) |
| ***D06M 11/70*** | (2006.01) |
| ***D06M 11/47*** | (2006.01) |
| ***D06M 23/00*** | (2006.01) |
| ***D21H 21/34*** | (2006.01) |
| ***D06M 13/292*** | (2006.01) |
| ***D06M 13/44*** | (2006.01) |
| ***D06M 13/453*** | (2006.01) |
| ***A62B 17/00*** | (2006.01) |
| ***D06M 11/68*** | (2006.01) |
| ***D06M 11/69*** | (2006.01) |
| ***D06M 13/282*** | (2006.01) |

(52) U.S. Cl.

CPC .............. *D06M 23/00* (2013.01); *D06M 11/71* (2013.01); *D06M 2200/30* (2013.01); *D06M 11/36* (2013.01); *D06M 11/70* (2013.01); *D06M 11/47* (2013.01); *D21H 21/34* (2013.01); *D06M 13/292* (2013.01); *D06M 13/44* (2013.01); *D06M 13/453* (2013.01); *A62B 17/003* (2013.01); *D06M 11/68* (2013.01); *D06M 11/69* (2013.01); *D06M 13/282* (2013.01); *Y10S 428/92* (2013.01); *Y10S 428/921* (2013.01)

USPC ........... 442/138; 442/366; 442/415; 428/920; 428/921

(58) Field of Classification Search

USPC .................. 442/415, 138, 366; 428/920, 921

See application file for complete search history.

(56) References Cited

U.S. PATENT DOCUMENTS

| | | | | |
|---|---|---|---|---|
| 2,610,338 | A | 9/1952 | Taylor | |
| 3,889,022 | A | 6/1975 | Whittaker et al. | |
| 3,900,327 | A | 8/1975 | Miller | |
| 3,934,066 | A | 1/1976 | Murch | 442/221 |
| 3,985,706 | A | 10/1976 | Kay | 260/45.75 W |
| 4,097,560 | A | 6/1978 | Littman et al. | |
| 4,148,602 | A | 4/1979 | LeBlanc et al. | 8/115.7 |
| 4,216,261 | A | 8/1980 | Dias | 428/264 |
| 4,273,879 | A | 6/1981 | Langer et al. | 521/91 |
| 4,442,164 | A | 4/1984 | Briggs et al. | 428/283 |
| 4,448,841 | A | 5/1984 | Glass et al. | 428/270 |
| 4,504,991 | A | 3/1985 | Klanchik | |
| 4,824,709 | A | 4/1989 | Tschirch | |
| 4,866,799 | A | 9/1989 | Glackin | 5/459 |
| 4,923,729 | A | 5/1990 | Porter et al. | 428/71 |
| 4,996,099 | A | 2/1991 | Cooke et al. | 428/245 |
| 5,024,851 | A | 6/1991 | Goad et al. | |
| 5,070,119 | A | 12/1991 | Nugent, Jr. et al. | 523/179 |
| 5,091,243 | A | 2/1992 | Tolbert et al. | 428/253 |
| 5,175,197 | A | 12/1992 | Gestner et al. | 523/218 |
| 5,384,188 | A | 1/1995 | Lebold et al. | 442/414 |
| 5,433,991 | A | 7/1995 | Boyd, Jr. et al. | |
| 5,534,325 | A | 7/1996 | Jorder et al. | |
| 5,578,368 | A | 11/1996 | Forsten et al. | 428/229 |
| 5,645,926 | A | 7/1997 | Horrocks et al. | 442/234 |
| 5,811,359 | A | 9/1998 | Romanowski | 442/261 |
| 5,830,319 | A | 11/1998 | Landin | 162/159 |
| 5,912,196 | A | 6/1999 | Radwanski et al. | 442/153 |

(Continued)

FOREIGN PATENT DOCUMENTS

| | | | | |
|---|---|---|---|---|
| CA | 2281416 A1 | 3/2000 | B32B 5/02 |
| EP | 0 391 000 A2 | 10/1990 | |

(Continued)

OTHER PUBLICATIONS

"Fiber Science" pp. 273-275, 1995.

(Continued)

*Primary Examiner* — Elizabeth Cole

(74) *Attorney, Agent, or Firm* — Myers Bigel Sibley & Sajovec, PA

(57) ABSTRACT

A thermally protective, flame retardant fabric includes a substrate treated with a combination of a flame retardant agent and an intumescent agent. The substrate includes non-thermoplastic fibers or a blend of non-thermoplastic fibers and thermoplastic fibers having a basis weight ranging from 2.0 to 15.0 ounces per square yard. The fabric has a contact thermal protective performance value of at least 4.5 and a contact thermal protective performance efficiency greater than 1.1. Applications of the fabric include protective garments, articles of furniture, vehicle components, building components, electrical components, decorative components, appliances, and containers.

30 Claims, No Drawings

(56) References Cited

U.S. PATENT DOCUMENTS

| | | | | |
|---|---|---|---|---|
| 6,132,476 | A | 10/2000 | Lunsford et al. | 8/531 |
| 6,153,668 | A | 11/2000 | Gestner et al. | 523/179 |
| 6,153,674 | A | 11/2000 | Landin | 524/35 |
| 6,207,085 | B1 | 3/2001 | Ackerman | |
| 6,265,082 | B1 | 7/2001 | Dunham et al. | 428/500 |
| 6,309,746 | B1 | 10/2001 | Broutier et al. | |
| 6,420,470 | B1 | 7/2002 | Miksic et al. | 524/411 |
| 6,436,528 | B1 | 8/2002 | Kulper et al. | |
| 6,747,074 | B1 | 6/2004 | Buckingham et al. | |
| 2004/0062912 | A1 | 4/2004 | Mason et al. | |

FOREIGN PATENT DOCUMENTS

| | | | |
|---|---|---|---|
| GB | 1523152 | | 12/1978 |
| GB | 2293572 | | 4/1996 |
| GB | 2 336 163 | A | 10/1999 |
| GB | 2 352 447 | A | 1/2001 |
| JP | 08-226057 | | 9/1996 |
| WO | WO 93/18824 | | 9/1993 |

OTHER PUBLICATIONS

"Complete Textile Glossary", definition of nonwoven.
Adanur, Wellington Sears Handbook of Industrial Textiles, p. 153 (1995).
American Cyanamid Company, "Intumescent Coating Applications" (1990).
E I du Pont de Nemours & Co., Inc., Res. Disclosure 138:9 (1975).
Kandola & horrocks, Textile Res. J. 69(5):374-381 (1999).
Horrocks, Polymer Degradation Stability 54:143-154 (1996).
Horrocks & Kandola, J. Coated Fabrics 27:17-26 (1997).
Horrocks et al., Indian J. Fibre Textile Res. 22:264-273 (1997).
Horrocks et al., Nonwovens World 9:75-82 (2000).
Horrocks, et al., Polymer Intl. 49:1079-1091 (2000).

THERMALLY PROTECTIVE FLAME RETARDANT FABRIC

CROSS-REFERENCE TO RELATED APPLICATION

This application is a continuation of U.S. patent application Ser. No. 10/143,833, filed on May 14, 2002, now abandoned the disclosure of which is hereby incorporated herein by reference in its entirety.

BACKGROUND OF THE INVENTION

1. Field of the Invention

The present invention relates to a thermally protective, flame retardant fabric and, more particularly, to a lightweight fabric providing protection from heat, flame, and electrical arc that is suitable for use in a wide range of products. Applications of the fabric include protective garments, articles of furniture, vehicle components, building components, electrical components, decorative components, appliances, and containers.

2. Description of the Related Art

Thermal protective fabrics are known in the art. In one application, apparel made from these fabrics protects users in a range of hazardous environments. Thermally protective fabrics typically provide a combination of thermal insulation properties and heat reflection and/or absorption properties. This combination of properties may reduce or eliminate heat-related and burn-related injuries.

There are several qualities a fabric may possess in order to be a good thermal insulator. One quality is the ability of the fabric to trap air. A fabric with good air-trapping features may be formed by constructing the fabric with fibers, such as cotton or wool, that are themselves good insulators. Such a fabric may also be formed by constructing the fabric in such a way that it provides interstices or layers in which air or other gases can collect. One example of such a fabric is a needlepunched, nonwoven material. Needlepunched, nonwoven fabrics are manufactured by overlapping carded layers of fiber and then entangling them by penetrating the layers with rigid needles. The result is a soft, lofty fabric with many pockets for air collection.

Heat reflection and/or absorption properties in a fabric may be provided by a finish, such as a coating, that can reflect and/or absorb heat. Conventional thermally protective fabrics have used coatings made from metallized compounds, including aluminum or titanium, to reflect the heat energy. However, these finishes are typically stiff, difficult to apply, and expensive.

Coatings used to absorb heat have been formed from one or more intumescent compounds. Intumescent compounds are compounds that react on contact to flame by charring and swelling. The layers of char that are formed may fill with nonflammable gas created in the intumescent reaction and, thus, provide more layers of insulation. Intumescent compounds have typically been used in building materials and paints to prevent the spread of fire and structural damage. These compounds, however, have been used with only limited success in the field of textiles.

The degree of thermal protection provided by a fabric is measured with an industry standard test. The NFPA 1971 Standard on Protective Ensemble for Structural Fire Fighting, Section 6-10 describes a Thermal Protective Performance (TPP) test for predicting time to second-degree burn when exposed to convective/radiant energy for a short duration.

In the test, the thermal resistance of three 6"×6" samples is averaged using a CSI Thermal Protective Performance Tester. Heat exposure is provided by a combination of a largely convective heat source provided by two laboratory burners and a radiant source provided by a bank of quartz tubes. The gas burners are set at 45 degrees to vertical so that the flames converge at a point directly beneath the sample and burn 98% pure methane at a flow rate of 135 units on the CSI apparatus. The quartz tubes are adjusted to 48% on the instrument scale. The instrument is calibrated to insure the delivery of an exposure averaging 2.0 cal/cm$^2$ sec.

The fabric sample to be tested is mounted in a sample holder positioned above the heat source. The heat transfer through the fabric is measured by a calorimeter that is placed above the fabric sample, either in direct contact with the sample or suspended above the sample by means of a standard spacer. Test results for these two types of tests are reported as "contact" or "spaced" results, respectively.

During the test, a computer utilizing specially designed data acquisition software accurately records the rise in temperature of the calorimeter. The rate of temperature rise (i.e., the slope of the temperature vs. time trace) is used in conjunction with the calorimeter constants to compute the heat flux received. A square wave exposure sequence is used so that results can be related to the values obtained in a Stoll curve. A human tissue tolerance overlay, obtained by integration of the Stoll curve with respect to time, is used to determine tolerance times to second-degree burns. The TPP rating is calculated as the product of exposure energy heat flux and time to second-degree burn.

Table 1 lists the TPP test results for several conventional thermally protective fabrics.

TABLE 1

TPP Performance of Conventional Fabrics

| Fabric | Weight (osy) | TPP (contact) | TPP Efficiency[1] (contact) | TPP (spaced)[2] | TPP Efficiency (spaced) |
|---|---|---|---|---|---|
| NOMEX | 4.5 | 4.8 | 1.1 | 11.8 | 2.6 |
| IIIA | 6.1 | 5.1 | 0.8 | 13.4 | 2.2 |
| | 7.5 | | | 16.1 | 2.1 |
| INDURA | 6.0 | | | 7.3 | 1.2 |
| | 8.4 | 6.6 | 0.8 | 9.4 | 1.1 |
| | 10.0 | 7.1 | 0.7 | 11.1 | 1.1 |
| BANWEAR | 8.6 | | | 9.4 | 1.2 |
| | 11.5 | | | 12.7 | 1.1 |
| FIREWEAR | 5.6 | | | 8.4 | 1.5 |
| | 9.5 | | | 11.0 | 1.2 |

[1]Efficiency is defined as TPP/weight.
[2]¼" spacer placed between the sample and the sensor The highest TPP value seen in Table 1 is 16.1 on 7.5 ounces per square yard (osy) NOMEX IIIA during a spaced test, meaning that a ¼" spacer was placed between the sample and the sensor. The efficiency (spaced) of this weight fabric is therefore 2.1. As used herein, the term "efficiency" means TPP/weight. Note that the efficiency (contact) of this same fabric at lower weights is significantly reduced to 1.1 for the 4.5 osy product and 0.8 for the 6.1 osy product. A fabric that can produce TPP values in these ranges at lower weights is therefore a more efficient insulator and would offer users a lighter weight alternative without sacrificing protection.

Most conventional fabrics in the thermal protection market are designed for extended use for periods of one year or more. These fabrics must therefore be durable enough to withstand continual use, possibly in an industrial environment. In the case of garments, such use may include repeated laundering and repeated wear. In addition, thermally protective fabrics must remain flame retardant and thermally protective during the period of use. In order to achieve this durability, conventional fabrics have increased thickness and weight, which limit their versatility.

In one illustrative example, conventional fabrics may be used to make thermally protective garments. The most prevalent fabrics in the thermally protective garment market are aramids and flame retardant cotton. Most high performance thermally protective fabrics are aramids, such as NOMEX IIIA made by Dupont. For example, these fabrics dominate the fire department wear market. Flame retardant cotton, on the other hand, is used more extensively in general industrial use. This is due primarily to the more favorable hand (i.e., texture) and comfort of flame retardant cotton, and the significantly higher costs associated with aramid fabrics.

This pattern of usage indicates industry's concern over the capital expense associated with thermal protective apparel programs. Aramid fabrics are generally considered superior to flame retardant cotton in terms of durability, launderability, and thermal performance, yet the price and comfort associated with flame retardant cotton make it a desirable alterative. The market strength of aramids in a particular industry increases as the risk of exposure to fire increases.

Conventional aramid fabrics include NOMEX IIIA from Dupont, PBI from Hoechst Celanese, and KERMEL from Rhone-Poulenc Fibers. These fabrics are available in a variety of weights and may be blended with other fibers to reduce cost. Common uses for these fabrics include fireman's bunker gear, fire entry suits, apparel for utility workers, and apparel for some industrial applications.

Conventional flame retardant cotton fabrics and blended fabrics include INDURA from Westex, Inc., FIREWEAR from Springfield, and BANWEAR from ITEX, Inc. Other fabrics include BASOFIL from BASF, made from a melamine fiber, and FR VISCOSE from Lenzing Fibers, made from a permanently flame retardant viscose. The above fabrics are available in a variety of weights. Common uses include flame retardant apparel, such as coveralls, shirts, and pants for general industry, apparel for utility workers, and fireman's stationwear.

The above fabrics have been used to produce a variety of durable thermally protective products suitable for extended use in their respective industries. However, each of these products has deficiencies, such as weight, comfort, and cost. These and other deficiencies of conventional thermally protective fabrics have limited and, in some cases, precluded their use in a variety of applications other than garments, such as articles of furniture, vehicle seats, vehicle bodies, electrical products, building components, and flame blocking components.

There is currently a need for lightweight, low cost, fabrics that provide a high degree of protection from heat caused by flame and electrical arc, for example.

SUMMARY OF THE INVENTION

To overcome the drawbacks of the prior art and in accordance with the invention, as embodied and described herein, one aspect of the invention relates to a fabric comprising a substrate treated with a combination of a flame retardant agent and an intumescent agent. The substrate comprises non-thermoplastic fibers having a basis weight ranging from 2.0 to 15.0 ounces per square yard and the fabric has a contact thermal protective performance value of at least 4.5. The substrate may also comprise a blend of non-thermoplastic fibers and thermoplastic fibers.

Another aspect of the invention relates to a method of forming a thermally protective, flame retardant fabric. The method comprises applying a flame retardant chemical to a substrate, applying a finish comprising an intumescent coating to the substrate, and drying the substrate.

A further aspect of the invention relates to a method of forming a thermally protective, flame retardant fabric. The method comprises applying a finish to a substrate and drying the substrate. The finish comprises an intumescent, flame retardant coating.

Additional advantages of the invention will be set forth in part in the description that follows. The advantages of the invention will be realized and attained by the elements and combinations particularly pointed out in the appended claims.

It is to be understood that both the foregoing general description and the following detailed description are exemplary and explanatory only and are not restrictive of the invention, as claimed.

DETAILED DESCRIPTION OF EXEMPLARY EMBODIMENTS

Reference will now be made in detail to several exemplary embodiments of the invention. It should be understood that all embodiments discussed herein are exemplary regardless of whether they are referred to as "exemplary" embodiments.

The thermally protective, flame retardant fabric according to the present invention is a lightweight fabric providing protection from heat, flame, and electrical arc. The invention provides a soft, flexible, finished fabric that may be suitable for use in a wide range of products. The products may have flame blocking characteristics. In addition, the fabric may be dyed to a variety of shades and/or patterns. Further, the fabric may be durable enough for long term usage, but may also be inexpensive enough to be disposable and/or suitable for limited use applications.

The fabric according to the present invention may be used in a variety of applications. The fabric may be used in protective garments, including, for example fire retardant suits, fire retardant gloves, fire blankets, blast blankets, welding suits, welding drapes, welding pads, and welding filters. The fabric may also be used in other types of protective garments.

The fabric according to the present invention may also be used in articles of furniture, such as, for example, mattresses, chairs, sofas, and seats.

Additional uses include vehicle components, such as, for example, vehicle seats, vehicle beds, vehicle doors, vehicle bodies, mobile homes, trailers, insulation, and fuel tank exterior liners. As used herein, "vehicle" means device used in transportation.

Further uses of the fabric of the present invention include building components, such as, for example, insulation, air filters, chimney casing liners, roofing underlayments, building partitions, ceiling tiles, modular homes, and bomb shelters.

Further uses of the fabric of the present invention include electrical components, such as, for example, electrical panels, wire conduit liner, and lightning protection devices.

Other uses of the fabric of the present invention include decorative components, such as, for example, fireplace rugs, Christmas stockings, and Christmas tree skirts.

Further uses of the fabric of the present invention include appliances, such as, for example, attic fans, liners for water heaters, liners for clothes dryers, and exhaust duct liners for heaters, and exhaust duct liners for clothes dryers.

Still further uses of the fabric of the present invention include containers, such as, for example, fire retardant document pouches, fire retardant safes, packaging containers for explosives, shipping containers for explosives, and fire retardant ammunition cases.

The above description of applications of the fabric according to the present invention is not intended to be an inclusive list. Other applications are envisioned. In accordance with these applications, many devices and components may be constructed from the material of the present invention. As used herein, "constructed from" means made from exclusively or in combination with other materials.

The fabric of the present invention provides a high degree of thermal protection compared to conventional fabrics. In one embodiment, the fabric has a contact thermal protective performance value of at least 4.5. In another embodiment, the fabric has a contact thermal protective performance value of at least 6.5. In a further embodiment, the fabric has a contact thermal protective performance value of at least 9.0. In a still further embodiment, the fabric has a contact thermal protective performance efficiency greater than 1.1.

The weight of the fabric may contribute to comfort as well as insulative properties. In one embodiment, the substrate comprises fibers having a basis weight ranging from 3.0 to 8.0 ounces per square yard. In another embodiment, the substrate comprises fibers having a basis weight ranging from 5.0 to 6.5 ounces per square yard.

The density of the fabric, defined as its weight divided by its thickness, may relate to the ability of the fabric to form a barrier. In one embodiment, the fabric has a thickness ranging from 0.01 to 0.15 inches. In another embodiment, the fabric has a thickness ranging from 0.04 to 0.09 inches.

In one embodiment, the substrate is chosen from nonwoven fabrics, woven fabrics, and knitted fabrics. In another embodiment, the substrate comprises a nonwoven fabric chosen from needlepunched, spunbonded, thermalbonded, spunlaced, resin bonded, stitch bonded, and meltblown fabrics.

In a further embodiment, the substrate comprises nonthermoplastic fibers. In a still further embodiment, the substrate comprises a blend of non-thermoplastic fibers and thermoplastic fibers. Optionally, synthetic fibers, such as polyester, may be blended to improve strength and/or dimensional stability of the finished fabric. The weight, blend ratio, and thickness of the fabric may be determined by the manufacturing process.

In one embodiment, the fabric comprises a blend of cellulosic fibers combined with at least one temperature resistant fiber. As used herein, "temperature resistant fiber" means a fiber having a melting point above 200° C. In a further embodiment, the cellulosic fibers are chosen from rayon, cotton, and woodpulp. The cellulosic fiber may provide a source of carbon that chars to maintain its integrity, rather than melting, upon exposure to flame. In a still further embodiment, the at least one temperature resistant fiber is chosen from glass, kevlar, asbestos, carbon, polyphenylene benzobisoxazole, polybenzimidazole, para-aramids, meta-aramids, fluorocarbons, polyphenylene sulfides, melamines, and polyimides.

There are at least two flame retardant mechanisms that occur in the fabric of the present invention when the fabric is exposed to heat. The first is a flame retardant chemistry that prevents ignition and self-sustaining flame when the fabric is subjected to a heat source. The second is a barrier chemistry that causes the fabric to char and swell when exposed to flame to provide an insulating thermal barrier. These two mechanisms may act independently or cooperatively.

The flame retardant chemistry of the fabric of the present invention will be described first. Combustion requires three key components commonly referred to as the "Fire Triangle": fuel, heat, and oxygen. If any of these ingredients are removed from the reaction, combustion will cease. Thus, to be effective, a flame retardant may interfere with one or more of the three components of combustion in one or more of the following ways: removing the heat; increasing the decomposition temperature at which significant volatile gases (i.e., the fuel) form; decreasing the amount of combustible gases and promoting char formation; preventing the access of oxygen to the flame or diluting the fuel gases to a concentration lower than that needed to support combustion; and increasing the combustion temperature of the fuels and/or interfering with their flame chemistry.

There are several basic types of finishes that can be used to render cellulosic fabrics flame retardant. Some of these compounds have elements in common that act in one or more of the ways listed above to increase flame retardancy. Compounds containing boron, phosphorous, nitrogen, and halogens (e.g., bromine, chlorine) all find use in commonly produced flame retardant fabrics.

Boron compounds coat the fiber with a glassy film to insulate the polymer being protected. These compounds may increase the combustion temperature of the fuels and/or interfere with their flame chemistry.

Phosphorous compounds react with cellulose to prevent the formation of volatiles, which act as fuel to the flame. In addition, these compounds may promote the formation of char.

Nitrogen compounds alone are generally not good flame retardants. However, they may synergistically enhance the effects of phosphorous compounds to provide flame retarding effects.

Halogen compounds scavenge hydrogen and hydroxyl free radicals, thus breaking down the combustion chain reaction caused by these radicals.

Commercial products that may be used according to the present invention may utilize all of the mechanisms described above. Some of these products are listed in Table 2 with their chemical nature and manufacturer. This list includes several of the many possible commercial products that may be used as a flame retardant according to the present invention. Other available products may also be used. Many of the listed chemicals may be mixed with selected binders to add hand or durability to the finished fabric. These binders may also aid the barrier chemistry described below.

TABLE 2

Exemplary Flame-Retardants for Use in Invention

| Product | Chemical Nature | Manufacturer |
|---|---|---|
| SPARTAN 590 | Organic/Inorganic Phosphate blend | Spartan Flame Retardants |
| SPARTAN 880 | Organic/Inorganic Phosphate blend | Spartan Flame Retardants |
| SPARTAN AR371 | Organic/Inorganic Phosphate blend | Spartan Flame Retardants |
| APEX FLAMEPROOF 2487 | Organic Phosphate Ammonia Salt | Apex Chemical Corporation |
| APEX FLAMEPROOF 2477 | Organic Phosphate Ammonia Salt | Apex Chemical Corporation |
| ANTIBLAZE N | Cyclic Phosphorous Compound | Rhodia |
| ANTIBLAZE NT | Cyclic Phosphorous Compound | Rhodia |

TABLE 2-continued

Exemplary Flame-Retardants for Use in Invention

| Product | Chemical Nature | Manufacturer |
|---|---|---|
| GUARDEX FRC-PHN | Phosphorous/Nitrogen Derivatives | Glo-tex International, Inc. |
| GUARDEX FRC HV-NF | Proprietary Compound | Glo-tex International, Inc. |
| PYROZYL PCN | Phosphoric Acid/Ammonia | Amitech, Inc. |
| E-20602 | Proprietary Compound | High Point Textile Auxiliaries |
| APEX 344-HC | Halogenated Compound/Antimony Oxide | Apex Chemical Corporation |
| HIPOFIRE BRA | Docabromodiphenyloxide/ Antimonytrioxide | High Point Textile Auxiliaries |
| Generic chemicals | monophosphate, diammonium phosphate, ammonium sulfamate, ammonium borate, ammonium bromide, urea, pentabromodiphenyl oxide, chlorinated paraffin | Assorted manufacturers |

The barrier chemistry of the fabric of the present invention will now be described. The thermal barrier of the fabric is provided by an intumescent finish that chars and swells upon contact to flame.

There are four basic components to any intumescent system: a phosphorous-releasing catalyst, a source of carbon (i.e., a carbonific), a resinous material, and a blowing agent that is a source of nonflammable gas. On exposure to flame, these components interact to form the thermal barrier. First, the catalyst decomposes to form phosphoric acid. The acid then reacts with the carbonific. Next, the phosphated carbonific decomposes to form a large volume of foamable carbon and gas, and then releases the acid. Simultaneously, the resinous material melts to form a film over the foamable carbon. The blowing agent then releases gas that further causes the carbon to foam, while the film assists to retain the gases within the foam. The intumescent system thus forms a thick, highly effective thermal insulation layer.

Table 3 lists several of the intumescent products that may be used in the invention. Other available products may also be used. Although all of these products are proprietary compounds, they all use the intumescent mechanism described above. Some are designed to be applied as a coating, while others may be padded on the fabric.

TABLE 3

Exemplary Intumescent Finishes for Use In Invention

| Product | Application Method | Manufacturer |
|---|---|---|
| Spartan 982 | Coating | Spartan Flame Retardants |
| Glotard BFA | Pad | Glo-tex International, Inc. |
| Pyromescent 3901 | Coating | Amitech, Inc. |
| Unibond 1114 | Coating | Unichem, Inc. |
| Glotard FRC BJ-M | Coating | Glo-tex International, Inc. |
| Glotard W263A | Pad | Glo-tex International, Inc. |

The present invention provides two embodiments of a method of forming a thermally protective, flame retardant fabric.

In the first embodiment, the method comprises applying a flame retardant chemical to a substrate, applying a finish comprising an intumescent coating to the substrate, and drying the substrate.

The finish may further comprise a colorant. The presence of the colorant may allow the substrate to be dyed to a desired color and/or in a desired pattern.

The flame retardant chemical may be applied by a method chosen from pad application and spray application. Other known chemical application techniques may also be used. The application of the flame retardant chemical may prevent ignition of the fabric and/or propagation of a flame when the fabric is exposed to a flame. In one embodiment, the flame retardant chemical is applied to the substrate in an amount ranging from 5 to 100% solids by weight based on the weight of the fabric. In another embodiment, the flame retardant chemical is applied to the substrate in an amount ranging from 35 to 85% solids by weight based on the weight of the fabric.

The finish comprising an intumescent coating may be applied by a method chosen from pad application, spray application, knife application, roller application, and die coating. Other known chemical application techniques may also be used. The intumescent coating is designed to act as a barrier when the treated fabric is exposed to flame. The intumescent coating may be foamed and/or frothed depending on the stability of the foam. In one embodiment, the finish is applied to the substrate in an amount ranging from 5 to 200% solids by weight based on the weight of the fabric. In another embodiment, the finish is applied to the substrate in an amount ranging from 15 to 50% solids by weight based on the weight of the fabric.

The substrate may be dried by means of a tentered oven and/or other known fabric drying means.

The fabric produced using the method of the first embodiment may possess a face and a back. The face is the coated side, which would face outwards in a garment and be impinged by flame or heat.

In the second embodiment, the method comprises applying a finish to a substrate and drying the substrate. According to this embodiment, the finish comprises an intumescent, flame retardant coating.

The finish may further comprise a colorant. The presence of the colorant may allow the substrate to be dyed to a desired color and/or in a desired pattern.

The finish comprising an intumescent coating may be applied by a method chosen from pad application, spray application, knife application, roller application, and die coating. Other known chemical application techniques may also be used. In one embodiment, the finish is applied to the substrate in an amount ranging from 15 to 130% solids by weight based on the weight of the fabric.

The substrate may be dried by means of a tentered oven and/or other known fabric drying means.

The fabric produced using the method of the second embodiment may be saturated by the intumescent compound so there is no dependency on side (i.e., face or back) of the fabric.

The fabric according to the present invention may be disposable or suitable for limited use in applications. Consequently, durability to laundering is not an issue. The fabric may also be durable enough for extended use applications.

Examples of a thermally protective, flame retardant fabric according to the present invention comprising a blend of non-thermoplastic fibers and thermoplastic fibers will now be described.

Example 1

First Embodiment of Forming Method

A fabric was produced using the first embodiment of the forming method described above. The greige (i.e., unfinished) fabric was a 3.7 osy needlepunched 70/30 Rayon/Polyester blend. The polyester used was a 4.75 denier by 3" staple fiber and the rayon used was a 3.0 denier by 2½" fiber. The fabric was finished with the formulations listed in Table 4. The finish was applied in a pad application with the pad set to a pressure of 3.5 bar and speed of 2.8 m/min.

TABLE 4

Example 1 Pad Finish Properties

| Chemical | Concentration | Wet Pick-up | Dry Add-on |
|---|---|---|---|
| APEX FLAMEPROOF 2487 | 100% | 160% | 73% owf |

The intumescent coating was applied as listed in Table 5.

TABLE 5

Example 1 Froth Coating Properties

| Chemical | Concentration | Dry Add-on |
|---|---|---|
| SPARTAN 982 FR | 100% | 41% owf |

The SPARTAN 982 FR compound contains a foaming agent that allows the product to be foamed to a semi-stable froth. This mixture was foamed using a kitchen mixer. The coating method was knife over roller. There was no gap between the knife blade and the fabric.

The finished fabric was dried in a Werner-Mathis lab-scale forced air oven at 300° F. for 30 seconds. The flame retardant and TPP performances of the example are listed in Table 6.

TABLE 6

Example 1 Performance Properties

| Finished Weight (osy) | Tol. Time to $2^{nd}$ Degree Burn | TPP (contact) | TPP Efficiency (contact) | NFPA 701 Char Length | NFPA 701 After Flame | NFPA 701 # of Drips |
|---|---|---|---|---|---|---|
| 7.95 | 6.04 sec. | 11.95 | 1.50 | 2.75" | 0 sec. | 0 |

The TPP value reported in Table 6 was yielded from a contact test. The TPP value and TPP efficiency (TPP value/Finished Weight) of Example I are higher than that of NOMEX IIIA or INDURA (see Table 1).

Example 2

Second Embodiment of Forming Method

A fabric was produced using the second embodiment of the forming method described above. The greige fabric was the same greige used in Example 1. The fabric was then finished using the formula listed in Table 7.

TABLE 7

Example 2 Pad Finish Properties

| Chemical | Concentration | Wet Pick-up | Dry Add-on |
|---|---|---|---|
| GLOTARD BFA | 60% | 270% | 43% owf |
| GUARDEX FRC HV-NF | 36% | 270% | 62% owf |
| Water | 4% | 270% | N/A |

The finish was applied in a pad application with a pad pressure of 3.5 bar at 2.8 m/min. The saturated fabric was then dried in a Werner-Mathis lab-scale forced air oven at 300° F. for 30 seconds. The flame retardant and TPP performances of this sample are presented in Table 8.

TABLE 8

Example 2 Performance Properties

| Finished Weight (osy) | Tol. Time to $2^{nd}$ Degree Burn | TPP (contact) | TPP Efficiency (contact) | NFPA 701 Char Length | NFPA 701 After Flame | NFPA 701 # of Drips |
|---|---|---|---|---|---|---|
| 7.6 | 6.26 | 12.38 | 1.63 | 3.375" | 0 sec. | 0 |

The TPP value reported in Table 8 is also the result of a contact test. The TPP value and TPP efficiency of Example 2 are higher than those of NOMEX IIIA and the fabric of Example 1 (see Tables 1 & 6).

The finish formulations may be altered to use different chemicals or to adjust the add-on amounts of each chemical.

In addition to heat from flames, the fabric according to the present invention may also provide protection from the pulse of heat generated by an electrical arc. The heat attenuation factor (HAF) obtained from testing standard ASTM F-1959-99 is used to quantify the transfer of heat through a protective layer, such as a thermally protective, flame retardant fabric. The HAF is a measure of the ability of a material to inhibit the transmission of heat and is stated as a percentage. In one embodiment, the fabric has an HAF according to ASTM F-1959-99 of at least 70%. In another embodiment, the fabric has an HAF according to ASTM F-1959-99 of at least 85%.

The energy breakthrough threshold (Ebt) of a fabric is a measure of the energy in calories per square centimeter (cal/$cm^2$) a fabric can withstand without breaking open and while preventing a second degree burn. In one embodiment, the fabric has an Ebt of at least 8.0 cal/$cm^2$. In another embodiment, the fabric has an Ebt of at least 14.0 cal/$cm^2$. With these Ebt levels, the fabric of the present invention qualifies for use in a Category II environment under NFPA70E, the Standard for Electrical Safety Requirements for Employee Workplaces (2000).

Example 3

Panels of 6.4 Osy Cellulosic Material

Testing in accordance with ASTM F-1959-99 was conducted on a 6.4 osy flame retardant cellulosic material. The greige fabric was the same greige used in Examples 1 and 2 and the fabric was prepared as described in Example 2. In the tests, flat panels of the material were exposed to an electrical arc. The panels were spaced 12 inches from the arc and two electrodes were spaced 12 inches apart. The electrodes were operated with a current of 8.50 kA rms. The data was analyzed in accordance with ASTM F-1959-99. This data is listed below in Table 9.

TABLE 9

| Example 3 Test Results | | | | |
|---|---|---|---|---|
| Panel | Incident Energy (Cal/cm²) | Stoll Curve Deviation[1] (° C.) | Heat Attention Factor (%) | Break Open |
| 1 | 9.43 | −4.01 | 86.83 | N |
| 2 | 10.18 | −3.04 | 86.69 | N |
| 3 | 8.84 | −6.06 | 87.63 | N |
| 4 | 14.6 | −2.16 | 89.97 | Y |
| 5 | 17.44 | 2.82 | 89.38 | Y |
| 6 | 16.26 | −1.35 | 89.95 | Y |
| 7 | 11.82 | −5.01 | 89.05 | N |
| 8 | 12.00 | −2.54 | 87.41 | N |
| 9 | 12.01 | −2.02 | 86.31 | N |
| 10 | 12.50 | −2.90 | 88.14 | N |
| 11 | 12.45 | −1.38 | 86.42 | N |
| 12 | 11.51 | −4.75 | 88.28 | N |
| 13 | 13.47 | −4.00 | 89.33 | N |
| 14 | 14.91 | 4.38 | 86.91 | Y |
| 15 | 14.40 | −2.21 | 88.52 | N |
| 16 | 14.01 | −3.28 | 89.32 | N |
| 17 | 14.98 | .061 | 88.18 | Y |
| 18 | 13.25 | −2.18 | 86.85 | N |
| 19 | 14.51 | −2.41 | 88.76 | N |
| 20 | 14.27 | −2.85 | 89.30 | N |
| 21 | 14.25 | −2.01 | 88.48 | N |

[1]The Stoll Curve is an industry standard for the heat required to cause second degree burns.

As shown, of the 21 panels tested, five broke open when exposed to the electrical arc. The lowest incident energy (Ei) of the panels that broke open was 14.60 cal/cm$^2$. The highest Ei of the panels that did not break open was 14.51 cal/cm$^2$. None of the panels tested exhibited ignition, embrittlement, melting, or dripping. For the five panels with the highest Ei without breakthrough, the average Ebt was 14.3 cal/cm$^2$ and the average HAF was 88.0%.

An example of a thermally protective, flame retardant fabric according to the present invention comprising non-thermoplastic fibers will now be described.

Example 4

Material Comprising Non-Thermoplastic Fibers

A 3.5 osy needlepunched nonwoven fabric was produced using a blend of non-thermoplastic fibers as follows: Rayon, 45%; Lyocell, 45%; Para-aramid, 10%. The fabric was treated with GLO-TARD PFG, an intumescent, flame retardant coating manufactured by Glo-Tex Corporation. An acrylic binder, GLO-CRYL NE, was added to increase durability. The formula contained 53% GLO-TARD PFG and 7% GLO-CRYL NE. The remaining constituent was water. The fabric was dipped in the chemical bath and nipped to reduce the wet pick-up to 124%. The performance properties of this sample are presented in Table 10.

TABLE 10

| Example 4 Performance Properties | | |
|---|---|---|
| Finished Weight (osy) | TPP (contact) | TPP Efficiency (contact) |
| 5.66 | 12.53 | 2.21 |

As shown, the resulting fabric had a finished basis weight of 5.66 osy. In addition, the resulting TPP value for this product was 12.53, with a TPP efficiency of 2.21.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fabric consisting of a single layer of a non-woven substrate, wherein the non-woven substrate comprises cellulosic fibers, polyester fibers and aramid fibers, wherein the non-woven substrate is treated with an intumescent, flame retardant finish comprising one or more compounds comprising phosphorous and/or nitrogen, wherein the non-woven substrate has a basis weight ranging from 2.0 to 15.0 ounces per square yard, wherein the non-woven substrate is a non-woven stitch-bonded substrate, and wherein the fabric has a thickness ranging from 0.01 to 0.15 inches.

2. The fabric of claim 1, wherein the fabric has a contact thermal protective performance value of at least 6.5.

3. The fabric of claim 1, wherein the fabric has a contact thermal protective performance value of at least 9.0.

4. The fabric of claim 1, wherein the fabric has a contact thermal protective performance efficiency greater than 1.1.

5. The fabric of claim 1, wherein the non-woven substrate has a basis weight ranging from 5.0 to 6.5 ounces per square yard.

6. The fabric of claim 1, wherein the fabric has a contact thermal protective performance value of at least 4.5.

7. The fabric of claim 1, wherein the fabric has a thickness ranging from 0.04 to 0.09 inches.

8. The fabric of claim 1, wherein the fabric has a thickness ranging from 0.01 to 0.05 inches.

9. The fabric of claim 1, wherein the non-woven substrate has a basis weight ranging from 2.0 to 5.0 ounces per square yard.

10. The fabric of claim 1, wherein the non-woven substrate has a basis weight ranging from 3.0 to 8.0 ounces per square yard.

11. The fabric of claim 1, wherein the cellulosic fibers comprise cotton, rayon and/or lyocell fibers.

12. The fabric of claim 1, wherein the cellulosic fibers comprise rayon fibers.

13. The fabric of claim 1, wherein the cellulosic fibers comprise lyocell fibers.

14. A protective garment constructed from the fabric claimed in claim 1.

15. The protective garment of claim 14, wherein the protective garment is chosen from fire retardant suits, fire retardant gloves and welding suits.

16. An article of furniture constructed from the fabric claimed in claim 1.

17. The article of furniture of claim 16, wherein the article of furniture is chosen from mattresses, chairs, sofas, and seats.

18. A vehicle component constructed from the fabric claimed in claim 1.

19. The vehicle component of claim 18, wherein the vehicle component is chosen from vehicle seats, vehicle beds, vehicle doors, vehicle bodies, mobile homes, trailers, insulation, and fuel tank exterior liners.

20. The fabric of claim 1, wherein the intumescent, flame retardant finish is applied to the non-woven substrate in an amount ranging from 15 to 130 percent solids, based upon the weight of the non-woven substrate.

21. The fabric of claim 1, wherein the non-woven substrate has a basis weight ranging from 2.0 to 8.0 ounces per square yard and a thickness ranging from 0.04 to 0.09 inches.

22. The fabric of claim 1, wherein the non-woven substrate has a basis weight ranging from 2.0 to 8.0 ounces per square yard and a thickness ranging from 0.01 to 0.05 inches.

23. The fabric of claim 1, wherein the non-woven substrate has a basis weight ranging from 3.0 to 8.0 ounces per square yard and a thickness ranging from 0.04 to 0.09 inches.

24. The fabric of claim 1, wherein the non-woven substrate has a basis weight ranging from 3.0 to 8.0 ounces per square yard and a thickness ranging from 0.01 to 0.05 inches.

25. The fabric of claim 1, wherein the non-woven substrate has a basis weight ranging from 2.0 to 5.0 ounces per square yard and a thickness ranging from 0.04 to 0.09 inches.

26. The fabric of claim 1, wherein the non-woven substrate has a basis weight ranging from 2.0 to 5.0 ounces per square yard and a thickness ranging from 0.01 to 0.05 inches.

27. The fabric of claim 1, wherein the intumescent, flame retardant finish comprises one or more compounds comprising phosphorous and nitrogen.

28. The fabric of claim 1, wherein the cellulosic fibers comprise rayon and/or lyocell fibers and wherein the non-woven substrate has a basis weight ranging from 2.0 to 5.0 ounces per square yard and a thickness ranging from 0.01 to 0.05 inches.

29. The fabric of claim 28, wherein the fabric has a contact thermal protective performance value of at least 4.5.

30. The fabric of claim 28, wherein the fabric has a contact thermal protective performance efficiency of greater than 1.1.

* * * * *

UNITED STATES PATENT AND TRADEMARK OFFICE

CERTIFICATE OF CORRECTION

PATENT NO. : 8,796,162 B2
APPLICATION NO. : 12/172681
DATED : August 5, 2014
INVENTOR(S) : Monfalcone, III et al.

It is certified that error appears in the above-identified patent and that said Letters Patent is hereby corrected as shown below:

On Title Page:
Item 56, References Cited, U.S. PATENT DOCUMENTS, Line 12:
correct "4,504,991 A 3/1985 Klanchik"
to read -- 4,504,991 A 3/1985 Klancnik --

Signed and Sealed this
Sixth Day of January, 2015

Michelle K. Lee
*Deputy Director of the United States Patent and Trademark Office*